US011113299B2

(12) United States Patent
Ghosh et al.

(10) Patent No.: US 11,113,299 B2
(45) **Date of Patent: *Sep. 7, 2021**

(54) SYSTEM AND METHOD FOR METADATA TRANSFER AMONG SEARCH ENTITIES

(71) Applicant: Apple Inc., Cupertino, CA (US)

(72) Inventors: Rishab Aiyer Ghosh, San Francisco, CA (US); Vipul Ved Prakash, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 182 days.

This patent is subject to a terminal disclaimer.

(21) Appl. No.: 16/390,870

(22) Filed: Apr. 22, 2019

(65) Prior Publication Data

US 2019/0317937 A1 Oct. 17, 2019

Related U.S. Application Data

(63) Continuation of application No. 15/431,075, filed on Feb. 13, 2017, now Pat. No. 10,311,072, which is a (Continued)

(51) Int. Cl.

*G06F 16/00* (2019.01)
*G06F 16/248* (2019.01)

(Continued)

(52) U.S. Cl.

CPC ........ *G06F 16/248* (2019.01); *G06F 16/2477* (2019.01); *G06F 16/24537* (2019.01);

(Continued)

(58) Field of Classification Search

None

See application file for complete search history.

(56) References Cited

U.S. PATENT DOCUMENTS

| | | | |
|---|---|---|---|
| 5,430,839 | A | 7/1995 | Jagannathan et al. |
| 6,006,225 | A | 12/1999 | Bowman et al. |

(Continued)

FOREIGN PATENT DOCUMENTS

| | | |
|---|---|---|
| JP | 2003-288437 A | 10/2003 |
| JP | 2006-202253 A | 8/2006 |

(Continued)

OTHER PUBLICATIONS

Wolf et al., "Optimal Crawling Strategies for Web Search Engines", Proceedings of the 11th International Conference on World Wide Web, 2002, pp. 136-147.

(Continued)

*Primary Examiner* — Bai D Vu

(74) *Attorney, Agent, or Firm* — Womble Bond Dickinson (US) LLP

(57) ABSTRACT

A new approach is proposed that contemplates systems and methods to ascribe or transfer metadata from one search-related entity to another, where each entity can be one of subject or source, citation, and object or target. First, one or more complete or incomplete attributes associated with one or more of entities across source, citation and target are identified with a high degree of probable accuracy, wherein such metadata or attributes include but are not limited to, time, language, and location of the entities. The identified attributes are then ascribed or transferred from one entity where the metadata is available to other search entities. Finally, the transferred attributes can be utilized to facilitate the selection and ranking of the cited targets for the search result.

23 Claims, 3 Drawing Sheets

300

Set and adjust citation searching, retrieving and ranking criteria and mechanisms based on user specification and/or internal statistical data
302

Retrieve a plurality of citations of objects that fit the search criteria
304

Identify one or more attributes associated with one or more of entities across source, citation and target with a high degree of accuracy
306

Ascribe or transfer the identified attributes from the entities where the metadata is available to other entities
308

Select objects as the search result based on the matching of the objects with the searching criteria as well as the transferred attributes of the objects
310

Related U.S. Application Data continuation of application No. 14/818,062, filed on Aug. 4, 2015, now Pat. No. 9,600,586, which is a continuation of application No. 13/160,082, filed on Jun. 14, 2011, now Pat. No. 9,129,017, which is a continuation-in-part of application No. 12/895,593, filed on Sep. 30, 2010, now Pat. No. 7,991,725, and a continuation-in-part of application No. 12/628,791, filed on Dec. 1, 2009, now Pat. No. 8,688,701, and a continuation-in-part of application No. 12/628,801, filed on Dec. 1, 2009, now Pat. No. 8,244,664.

(60) Provisional application No. 61/354,562, filed on Jun. 14, 2010.

(51) Int. Cl.
*G06F 16/2457* (2019.01)
*G06F 16/2453* (2019.01)
*G06F 16/9537* (2019.01)
*G06F 16/9535* (2019.01)
*G06F 16/2458* (2019.01)
*G06F 16/951* (2019.01)

(52) U.S. Cl.
CPC .. *G06F 16/24573* (2019.01); *G06F 16/24575* (2019.01); *G06F 16/24578* (2019.01); *G06F 16/951* (2019.01); *G06F 16/9535* (2019.01); *G06F 16/9537* (2019.01)

(56) References Cited

U.S. PATENT DOCUMENTS 6,151,585 A 11/2000 Altschuler et al.
6,286,005 B1 9/2001 Cannon
6,289,342 B1 9/2001 Lawrence et al.
6,886,010 B2 4/2005 Kostoff
6,889,209 B1 5/2005 Rabin et al.
6,952,806 B1 10/2005 Card et al.
7,143,091 B2 11/2006 Charnock et al.
7,269,545 B2 9/2007 Agichtein et al.
7,505,969 B2 3/2009 Musgrove et al.
7,512,612 B1 3/2009 Akella et al.
7,636,714 B1 12/2009 Lamping et al.
7,836,714 B2 11/2010 Carlson et al.
7,849,076 B2 12/2010 Zheng et al.
7,885,844 B1 2/2011 Cohen et al.
8,010,619 B1 8/2011 Lawler et al.
8,086,605 B2 12/2011 Xu et al.
8,086,608 B2 12/2011 Hampton
8,112,483 B1 2/2012 Emigh et al.
8,156,115 B1 4/2012 Erol et al.
8,166,026 B1 4/2012 Sadler
8,166,925 B2 5/2012 Suggett et al.
8,166,928 B2 5/2012 Moro
8,168,925 B2 5/2012 Demol et al.
8,168,926 B2 5/2012 Goto
8,176,032 B2 5/2012 Shen et al.
8,186,026 B2 5/2012 Xiang et al.
8,200,700 B2 6/2012 Moore et al.
8,266,009 B1 9/2012 Devlin et al.
8,266,145 B2 9/2012 Leung et al.
8,271,474 B2 9/2012 Walker et al.
8,326,880 B2 12/2012 Carson et al.
8,352,549 B2 1/2013 Sacco et al.
8,484,192 B1 7/2013 Sahami et al.
8,572,173 B2 10/2013 Briere et al.
8,676,875 B1 3/2014 Smith et al.
8,694,357 B2 4/2014 Ting et al.
8,804,757 B2 8/2014 Lu et al.
8,909,629 B2 12/2014 Seth et al.
9,245,055 B2 1/2016 Krois et al.
2002/0065959 A1 5/2002 Kim et al.
2002/0073079 A1 6/2002 Terheggen
2002/0188522 A1 12/2002 McCall et al.
2003/0033296 A1 2/2003 Rothmuller et al.
2003/0110056 A1 6/2003 Berghofer et al.
2003/0229531 A1 12/2003 Heckerman et al.
2004/0001160 A1 1/2004 Herley
2004/0177319 A1 9/2004 Horn
2004/0225592 A1 11/2004 Churquina
2005/0060312 A1 3/2005 Curtiss et al.
2005/0080312 A1 4/2005 Reinhardt
2005/0102259 A1 5/2005 Kapur
2005/0131897 A1 6/2005 Grasso et al.
2005/0154690 A1 7/2005 Nitta et al.
2005/0192957 A1 9/2005 Newbold
2005/0256866 A1 11/2005 Lu et al.
2005/0256886 A1 11/2005 Armanino et al.
2006/0023945 A1 2/2006 King et al.
2006/0041543 A1 2/2006 Achlioptas
2006/0059055 A1 3/2006 Lin
2006/0064431 A1 3/2006 Kishore et al.
2006/0074836 A1 4/2006 Gardner et al.
2006/0106847 A1 5/2006 Eckardt et al.
2006/0112111 A1 5/2006 Tseng et al.
2006/0112146 A1 5/2006 Song et al.
2006/0112148 A1 5/2006 Jennings et al.
2006/0215571 A1 9/2006 Vernal et al.
2006/0218577 A1 9/2006 Goodman et al.
2006/0248073 A1 11/2006 Jones et al.
2006/0256666 A1 11/2006 Lee
2006/0271887 A1 11/2006 Bier et al.
2006/0275833 A1 12/2006 Hagen
2006/0284086 A1 12/2006 Hasegawa
2006/0294085 A1 12/2006 Rose et al.
2006/0294086 A1 12/2006 Rose et al.
2006/0294134 A1 12/2006 Berkhim et al.
2007/0011155 A1 1/2007 Sarkar
2007/0027744 A1 2/2007 Carson et al.
2007/0069852 A1 3/2007 Mo et al.
2007/0073748 A1 3/2007 Barney
2007/0078699 A1 4/2007 Scott et al.
2007/0112761 A1 5/2007 Xu et al.
2007/0121843 A1 5/2007 Atazky et al.
2007/0124432 A1 5/2007 Holtzman et al.
2007/0150396 A1 6/2007 Rossen et al.
2007/0150398 A1 6/2007 Rossen et al.
2007/0156636 A1 7/2007 Norton et al.
2007/0156747 A1 7/2007 Samuelson et al.
2007/0166836 A1 7/2007 Manseki et al.
2007/0168533 A1 7/2007 Canright et al.
2007/0188533 A1 8/2007 Wada et al.
2007/0208613 A1 9/2007 Backer
2007/0214097 A1 9/2007 Parsons et al.
2007/0219863 A1 9/2007 Park et al.
2007/0220056 A1 9/2007 Arora
2007/0226248 A1 9/2007 Darr
2007/0282867 A1 12/2007 McAllister et al.
2007/0297405 A1 12/2007 He
2008/0004942 A1 1/2008 Calabria
2008/0005007 A1 1/2008 Chen et al.
2008/0010253 A1 1/2008 Sidhu et al.
2008/0033919 A1 2/2008 Arrouye et al.
2008/0058468 A1 3/2008 Younes
2008/0059454 A1 3/2008 Andrieu
2008/0059466 A1 3/2008 Luo et al.
2008/0059486 A1 3/2008 Pappas
2008/0082405 A1 4/2008 Martinez et al.
2008/0082491 A1 4/2008 Scofield et al.
2008/0091684 A1 4/2008 Ellis et al.
2008/0104225 A1 5/2008 Zhang
2008/0120411 A1 5/2008 Eberle
2008/0133426 A1 6/2008 Porat et al.
2008/0201348 A1 8/2008 Edmonds et al.
2008/0208911 A1 8/2008 Lee et al.
2008/0215428 A1 9/2008 Ramer et al.
2008/0215429 A1 9/2008 Ramer et al.
2008/0215557 A1 9/2008 Ramer et al.
2008/0215571 A1 9/2008 Huang et al.
2008/0215607 A1 9/2008 Kaushansky et al.
2008/0240073 A1 10/2008 Pun et al.
2008/0244038 A1 10/2008 Martinez

(56) References Cited

U.S. PATENT DOCUMENTS

| | | | |
|---|---|---|---|
| 2008/0270116 | A1 | 10/2008 | Godbole et al. |
| 2008/0275833 | A1 | 11/2008 | Zhou et al. |
| 2008/0288305 | A1 | 11/2008 | Laluzerne et al. |
| 2008/0288596 | A1 | 11/2008 | Smith et al. |
| 2008/0313011 | A1 | 12/2008 | Rose et al. |
| 2009/0005975 | A1 | 1/2009 | Forstall et al. |
| 2009/0006388 | A1 | 1/2009 | Ives et al. |
| 2009/0037412 | A1 | 2/2009 | Bard et al. |
| 2009/0043581 | A1 | 2/2009 | Abbott et al. |
| 2009/0043797 | A1 | 2/2009 | Dorie et al. |
| 2009/0048860 | A1 | 2/2009 | Brotman et al. |
| 2009/0049038 | A1 | 2/2009 | Gross |
| 2009/0049308 | A1 | 2/2009 | Jin et al. |
| 2009/0066722 | A1 | 3/2009 | Kriger et al. |
| 2009/0106224 | A1 | 4/2009 | Roulland et al. |
| 2009/0106244 | A1 | 4/2009 | Dash et al. |
| 2009/0108244 | A1 | 4/2009 | Reidling |
| 2009/0112683 | A1 | 4/2009 | Hamilton et al. |
| 2009/0119173 | A1 | 5/2009 | Parsons et al. |
| 2009/0144272 | A1 | 6/2009 | Adarsh et al. |
| 2009/0150827 | A1 | 6/2009 | Meyer et al. |
| 2009/0157490 | A1 | 6/2009 | Lawyer |
| 2009/0157667 | A1 | 6/2009 | Brougher et al. |
| 2009/0164904 | A1 | 6/2009 | Horowitz et al. |
| 2009/0164929 | A1 | 6/2009 | Chen et al. |
| 2009/0217178 | A1 | 8/2009 | Niyogi et al. |
| 2009/0217179 | A1 | 8/2009 | Mons et al. |
| 2009/0222551 | A1 | 9/2009 | Neely et al. |
| 2009/0228397 | A1 | 9/2009 | Tawakol et al. |
| 2009/0229531 | A1 | 9/2009 | Stillman |
| 2009/0234828 | A1 | 9/2009 | Tu |
| 2009/0240647 | A1 | 9/2009 | Green et al. |
| 2009/0240691 | A1 | 9/2009 | Yano et al. |
| 2009/0275850 | A1 | 11/2009 | Mehendale et al. |
| 2009/0276500 | A1 | 11/2009 | Karmarkar |
| 2009/0318342 | A1 | 12/2009 | Nagase et al. |
| 2009/0319342 | A1 | 12/2009 | Shilman et al. |
| 2010/0005034 | A1 | 1/2010 | Carpenter et al. |
| 2010/0017259 | A1 | 1/2010 | Luo |
| 2010/0058196 | A1 | 3/2010 | Krishnan et al. |
| 2010/0070448 | A1 | 3/2010 | Omoigui |
| 2010/0070485 | A1 | 3/2010 | Parsons et al. |
| 2010/0094385 | A1 | 4/2010 | Hendriks et al. |
| 2010/0094835 | A1 | 4/2010 | Lu et al. |
| 2010/0100537 | A1 | 4/2010 | Druzgalski et al. |
| 2010/0119053 | A1 | 5/2010 | Goeldi |
| 2010/0121817 | A1 | 5/2010 | Meyer et al. |
| 2010/0121839 | A1 | 5/2010 | Meyer et al. |
| 2010/0121849 | A1 | 5/2010 | Goeldi |
| 2010/0153404 | A1 | 6/2010 | Ghosh et al. |
| 2010/0174692 | A1 | 7/2010 | Meyer et al. |
| 2010/0174892 | A1 | 7/2010 | Steeb |
| 2010/0228614 | A1 | 9/2010 | Zhang et al. |
| 2010/0262597 | A1 | 10/2010 | Han |
| 2010/0280976 | A1 | 11/2010 | Carpenter et al. |
| 2010/0306192 | A1 | 12/2010 | Kapur et al. |
| 2010/0306249 | A1 | 12/2010 | Hill et al. |
| 2010/0312769 | A1 | 12/2010 | Bailey et al. |
| 2010/0325107 | A1 | 12/2010 | Kenton et al. |
| 2010/0332404 | A1 | 12/2010 | Valin |
| 2010/0332495 | A1 | 12/2010 | Richter et al. |
| 2011/0004465 | A1 | 1/2011 | Rose et al. |
| 2011/0004483 | A1 | 1/2011 | Ting et al. |
| 2011/0022602 | A1 | 1/2011 | Luo et al. |
| 2011/0035284 | A1 | 2/2011 | Moshfeghi |
| 2011/0040552 | A1 | 2/2011 | Van et al. |
| 2011/0040655 | A1 | 2/2011 | Hendrickson |
| 2011/0078156 | A1 | 3/2011 | Koss |
| 2011/0093458 | A1 | 4/2011 | Zheng et al. |
| 2011/0093459 | A1 | 4/2011 | Dong et al. |
| 2011/0145718 | A1 | 6/2011 | Ketola et al. |
| 2011/0179020 | A1 | 7/2011 | Ozzie et al. |
| 2011/0191364 | A1 | 8/2011 | Lebeau et al. |
| 2011/0191372 | A1 | 8/2011 | Kaushansky et al. |
| 2011/0212717 | A1 | 9/2011 | Rhoads et al. |
| 2011/0218946 | A1 | 9/2011 | Stern et al. |
| 2011/0231448 | A1 | 9/2011 | Cai et al. |
| 2012/0078894 | A1 | 3/2012 | Jiang |
| 2012/0166438 | A1 | 6/2012 | Wu et al. |
| 2012/0215903 | A1 | 8/2012 | Fleischman et al. |
| 2012/0226627 | A1 | 9/2012 | Yang |
| 2013/0304818 | A1 | 11/2013 | Brumleve et al. |
| 2014/0258280 | A1 | 9/2014 | Wilson et al. |

FOREIGN PATENT DOCUMENTS

| | | | |
|---|---|---|---|
| WO | 20061006059 | A1 | 1/2006 |
| WO | 2006/073977 | A1 | 7/2006 |
| WO | 2006/116515 | A2 | 11/2006 |
| WO | 2006/116516 | A2 | 11/2006 |
| WO | 2008/006059 | A2 | 1/2008 |
| WO | 2008/008059 | A1 | 1/2008 |
| WO | 2008/116516 | A2 | 10/2008 |

OTHER PUBLICATIONS

Phelan et al., "Using Twitter to Recommend Real-Time Topical News", Proceedings of the 2009 ACM Conference on Recommender Systems, RecSys 2009, 2009, pp. 385-388.

Office Action received for European Patent Application No. 09830721.8, dated Dec. 13, 2013, 13 pages.

Office Action received for European Patent Application No. 09830718.4, received on Dec. 12, 2013, 11 pages.

International Search Report and Written Opinion received for PCT Patent Application No. PCT/US11/40843, dated Sep. 22, 2011, 7 pages.

International Search Report and Written Opinion received for PCT Patent Application No. PCT/US11/40840, dated Sep. 22, 2011, 7 pages.

International Search Report and Written Opinion received for PCT Patent Application No. PCT/US11/40635, dated Sep. 6, 2011, 8 pages.

International Search Report and Written Opinion received for PCT Patent Application No. PCT/US11/40264, dated Sep. 20, 2011, 10 pages.

International Search Report and Written Opinion received for PCT Patent Application No. PCT/US11/40261, dated Sep. 20, 2011, 11 pages.

International Search Report and Written Opinion received for PCT Patent Application No. PCT/US09/06344, dated Feb. 23, 2010, 9 pages.

International Search Report and Written Opinion received for PCT Patent Application No. PCT/US09/06340, dated Apr. 2, 2010, 11 pages.

International Search Report and the Written Opinion of the International Searching Authority for corresponding International Application No. PCT/US2012/062156, dated Apr. 8, 2013, 7 pages.

International Preliminary Report on Patentability received for PCT Patent Application No. PCT/US2011/040264, completed on Oct. 10, 2012, 17 pages.

International Preliminary Report on Patentability received for PCT Patent Application No. PCT/US12/62156, dated May 8, 2014, 7 pages.

International Preliminary Report on Patentability received for PCT Patent Application No. PCT/US11/40843, dated Jan. 3, 2013, 7 pages.

International Preliminary Report on Patentability received for PCT Patent Application No. PCT/US11/40840, dated Jan. 3, 2013, 7 pages.

International Preliminary Report on Patentability received for PCT Patent Application No. PCT/US11/40635, dated Jan. 3, 2013, 6 pages.

International Preliminary Report on Patentability received for PCT Patent Application No. PCT/US11/40261, dated Dec. 27, 2012, 9 pages.

International Preliminary Report on Patentability received for PCT Patent Application No. PCT/US09/06344, dated Jun. 16, 2011, 9 pages.

(56) References Cited

OTHER PUBLICATIONS

International Preliminary Report on Patentability received for PCT Patent Application No. PCT/US09/06340, dated Jun. 16, 2011, 10 pages.
Hepp, Martin, "HyperTwiter: Collaborative Knowledge Engineering via Twitter Messages", In Proceedings of the 17th International Conference on Knowledge Engineering and Knowledge Management (EKAW2010), Part of the Lecture Notes in Computer Science book series (LNCS, vol. 6317), Oct. 11-15, 2010, 10 pages.
European Supplementary Search Report and Search Opinion Received for EP Application No. 09830718.4, dated Dec. 21, 2012, 12 pages.
European Search Report and Search Opinion Received for EP Application No. 09830721.8, dated Dec. 21, 2012, 14 pages.
Ziegler et al., "Propagation Models for Trust and Distrust in Social Networks", Information Systems Frontiers, vol. 7, Dec. 2005, pp. 337-358.
Zhou et al., "Powertrust: A robust and scalable reputation system for trusted peer-to-peer computing", IEEE Transactions on Parallel and Distributed Systems, vol. 18, Issue 4, Apr. 2007, 30 pages.
Von Der Weth et al., "Towards an objective assessment of centrality measures in reputation systems", The 9th IEEE International Conference on E-Commerce Technology and the 4th IEEE International Conference on Enterprise Computing, E-Commerce and E-Services (CEC-EEE 2007), Jul. 2007, 8 pages.
Tao et al., "Selectivity Estimation of Predictive Spatio-Temporal Queries", Proceedings 19th International Conference on Data Engineering (Cat. No. 03CH37405), Mar. 2003, pp. 417-428.
Page et al., "The PageRank Citation Ranking: Bringing Order to the Web", Technical Report. Stanford InfoLab, Jan. 29, 1998, pp. 1-17.
Massa et al., "Using Trust in Recommender Systems: An Experimental Analysis", International Conference on Trust Management, Part of the Lecture Notes in Computer Science book series (LNCS, vol. 2995), Feb. 26, 2004, pp. 221-235.
Makkonen et al., "Topic Detection and Tracking with Spatio-Temporal Evidence", European Conference on Information Retrieval, Advances in Information Retrieval, Part of the Lecture Notes in Computer Science book series (LNCS, vol. 2633), 2003, pp. 251-265.
Lu et al., "Finding Query Suggestions for PubMed", AMIA Annual Symposium Proceedings, 2009, pp. 396-400.
Liu et al., "Co-authorship networks in the digital library research community", Information Processing and Management, vol. 41, Issue 6, Dec. 2005, pp. 1462-1480.
Johnson, Caleb, "Likebutton.me Reveals What Your Friends 'Like' Across the Web", Apr. 26, 2010, pp. 1-7.
Huang et al., "Conversational Tagging in Twitter", HT '10 Proceedings of the 21st ACM Conference on Hypertext and Hypermedia, Jun. 13, 2010, pp. 173-178.
Guha et al., "Propagation of trust and distrust", In Proceedings of the 13th International Conference on World Wide Web, 2004, pp. 403-412.
Garfield, Eugene, "Citation Analysis as a Tool in Journal Evaluation", Science, vol. 178, No. 4060, 1972, pp. 527-544.
Fan et al., "Suggesting Topic-Based Query Terms as Your Type", 2010 12th International Asia-Pacific Web Conference, Apr. 2010, 7 pages.
Dietz et al., "Unsupervised Prediction of Citation Influences", Proceedings of the 24th International Conference on Machine Learning, Jun. 20, 2007, pp. 233-240.
Dai et al., "Mining Anchor Text Trends for Retrieval", European Conference on Information Retrieval, Advances in Information Retrieval, Part of the Lecture Notes in Computer Science book series (LNCS, vol. 5993), 2010, pp. 127-139.
Ashkan et al., "Classifying and Characterizing Query Intent", European Conference on Information Retrieval, Advances in Information Retrieval, Part of the Lecture Notes in Computer Science book series (LNCS, vol. 5478), 2009, pp. 578-586.
Anonymous, "H-index", Wikipedia, Internet Article, Jun. 10, 2010, pp. 1-6, Available online at <https://en.wikipedia.org/w/index.php?title=H-index&oldid=367229231>.

SYSTEM AND METHOD FOR METADATA TRANSFER AMONG SEARCH ENTITIES

RELATED APPLICATIONS

This application is a continuation of co-pending U.S. application Ser. No. 15/431,075 filed Feb. 13, 2017, which is a continuation of U.S. application Ser. No. 14/818,062 filed Aug. 4, 2015, now issued as U.S. Pat. No. 9,600,586, which is a continuation of U.S. application Ser. No. 13/160,082 filed Jun. 14, 2011, now issued as U.S. Pat. No. 9,129,017, which claims the benefit of U.S. Provisional Patent Application No. 61/354,562, filed Jun. 14, 2010, and entitled "A system and method for metadata transfer for search entities," and is hereby incorporated herein by reference. U.S. application Ser. No. 13/160,082 is a continuation-in-part of U.S. application Ser. No. 12/895,593 filed Sep. 30, 2010, now issued as U.S. Pat. No. 7,991,725. U.S. application Ser. No. 13/160,082 is also a continuation-in-part of U.S. application Ser. No. 12/628,791 filed Dec. 1, 2009, now issued as U.S. Pat. No. 8,688,701. U.S. application Ser. No. 13/160,082 is also a continuation-in-part of U.S. application Ser. No. 12/628,801 filed Dec. 1, 2009, now issued as U.S. Pat. No. 8,244,664.

BACKGROUND

Knowledge is increasingly more germane to our exponentially expanding information-based society. Perfect knowledge is the ideal that participants seek to assist in decision making and for determining preferences, affinities, and dislikes. Practically, perfect knowledge about a given topic is virtually impossible to obtain unless the inquirer is the source of all of information about such topic (e.g., autobiographer). Armed with more information, decision makers are generally best positioned to select a choice that will lead to a desired outcome/result (e.g., which restaurant to go to for dinner). However, as more information is becoming readily available through various electronic communications modalities (e.g., the Internet), one is left to sift through what is amounting to a myriad of data to obtain relevant and, more importantly, trust worthy information to assist in decision making activities. Although there are various tools (e.g., search engines, community boards with various ratings), there lacks any indicia of personal trustworthiness (e.g., measure of the source's reputation and/or influence) with located data.

Currently, a person seeking to locate information to assist in a decision, to determine an affinity, and/or identify a dislike can leverage traditional non-electronic data sources (e.g., personal recommendations—which can be few and can be biased) and/or electronic data sources such as web sites, bulletin boards, blogs, and other sources to locate (sometimes rated) data about a particular topic/subject (e.g., where to stay when visiting San Francisco). Such an approach is time consuming and often unreliable as with most of the electronic data there lacks an indicia of trustworthiness of the source of the information. Failing to find a plethora (or spot on) information from immediate non-electronic and/or electronic data source(s), the person making the inquiry is left to make the decision using limited information, which can lead to less than perfect predictions of outcomes, results, and can lead to low levels of satisfaction undertaking one or more activities for which information was sought.

Current practices also do not leverage trustworthiness of information or, stated differently, attribute a value to the influence of the source of data (e.g., referral). With current practices, the entity seeking the data must make a value judgment on the influence of the data source. Such value judgment is generally based on previous experiences with the data source (e.g., rely on Mike's restaurant recommendations as he is a chef and Laura's hotel recommendations in Europe as she lived and worked in Europe for 5 years). Unless the person making the inquiry has an extensive network of references from which to rely to obtain desired data needed to make a decision, most often, the person making the decision is left to take a risk or "roll the dice" based on best available non-attributed (non-reputed) data. Such a prospect often leads certain participants from not engaging in a contemplated activity. Influence accrued by persons in such a network of references is subjective. In other words, influence accrued by persons in such a network of references appear differently to each other person in the network, as each person's opinion is formed by their own individual networks of trust.

Real world trust networks follow a small-world pattern, that is, where everyone is not connected to everyone else directly, but most people are connected to most other people through a relatively small number of intermediaries or "connectors". Accordingly, this means that some individuals within the network may disproportionately influence the opinion held by other individuals. In other words, some people's opinions may be more influential than other people's opinions.

As referred to herein, influence is provided for augmenting reputation, which may be subjective. In some embodiments, influence is provided as an objective measure. For example, influence can be useful in filtering opinions, information, and data. It will be appreciated that reputation and influence provide unique advantages in accordance with some embodiments for the ranking of individuals or products or services of any type in any means or form. In addition, it would also be desirable if information, attributes, or metadata associated with one entity can be shared with other related entities in order to be able to identify relevant entities during search.

The foregoing examples of the related art and limitations related therewith are intended to be illustrative and not exclusive. Other limitations of the related art will become apparent upon a reading of the specification and a study of the drawings.

DETAILED DESCRIPTION OF EMBODIMENTS

The approach is illustrated by way of example and not by way of limitation in the figures of the accompanying drawings in which like references indicate similar elements. It should be noted that references to "an" or "one" or "some" embodiment(s) in this disclosure are not necessarily to the same embodiment, and such references mean at least one.

A new approach is proposed that contemplates systems and methods to ascribe or transfer metadata from one search-related entity to another, where each entity can be one of subject or source, citation, and object or target. As referred to hereinafter, each source or subject can be but is not limited to an internet author or user of social media services that cites a target or object, which can be but is not limited to Internet web sites, blogs, videos, books, films, music, image, video, documents, data files, etc. Each citation may describe, for a non-limiting example, an opinion by a source on a target or object. Each citation can be but is not limited to, a Tweet, a blog post, and a review of objects on an Internet web site. First, one or more complete or incomplete attributes associated with one or more of entities across source, citation and target are identified with a high degree of probable accuracy, wherein such metadata or attributes include but are not limited to, time, language, and location of the entities. The identified attributes are then ascribed or transferred from one entity where the metadata is available to other search entities. Finally, the transferred attributes can be utilized to facilitate the selection and ranking of the cited targets for the search result.

Citation Graph

Figure 1:
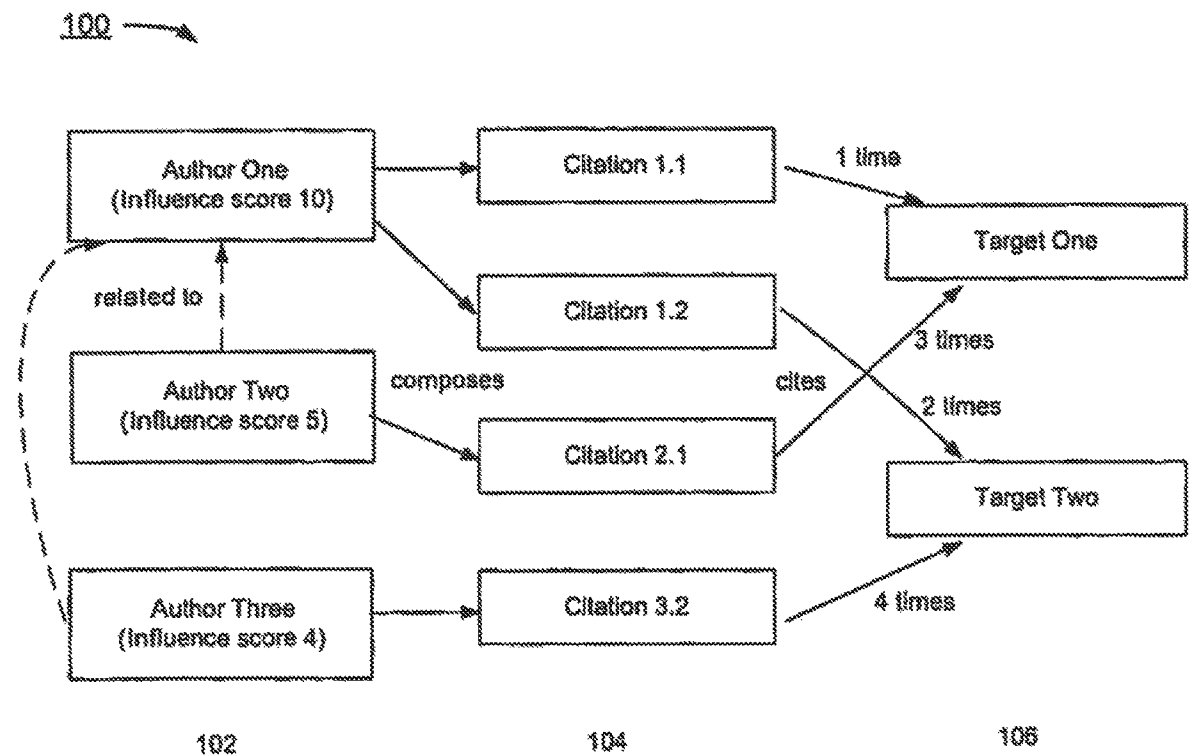
FIG. 1 depicts an example of a citation graph used to support citation search.

An illustrative implementation of systems and methods described herein in accordance with some embodiments includes a citation graph 100 as shown in FIG. 1. In the example of FIG. 1, the citation graph 100 comprises a plurality of citations 104, each describing an opinion of the object by a source/subject 102. The nodes/entities in the citation graph 100 are characterized into two categories, 1) subjects 102 capable of having an opinion or creating/making citations 104, in which expression of such opinion is explicit, expressed, implicit, or imputed through any other technique; and 2) objects 106 cited by citations 104, about which subjects 102 have opinions or make citations. Each subject 102 or object 106 in graph 100 represents an influential entity, once an influence score for that node has been determined or estimated. More specifically, each subject 102 may have an influence score indicating the degree to which the subject's opinion influences other subjects and/or a community of subjects, and each object 106 may have an influence score indicating the collective opinions of the plurality of subjects 102 citing the object.

In some embodiments, subjects 102 representing any entities or sources that make citations may correspond to one or more of the following:

- Representations of a person, web log, and entities representing Internet authors or users of social media services including one or more of the following: blogs, Twitter, or reviews on Internet web sites;
- Users of microblogging services such as Twitter;
- Users of social networks such as MySpace or Facebook, bloggers;
- Reviewers, who provide expressions of opinion, reviews, or other information useful for the estimation of influence.

In some embodiments, some subjects/authors 102 who create the citations 104 can be related to each other, for a non-limiting example, via an influence network or community and influence scores can be assigned to the subjects 102 based on their authorities in the influence network.

In some embodiments, objects 106 cited by the citations 104 may correspond to one or more of the following: Internet web sites, blogs, videos, books, films, music, image, video, documents, data files, objects for sale, objects that are reviewed or recommended or cited, subjects/authors, natural or legal persons, citations, or any entities that are or may be associated with a Uniform Resource Identifier (URI), or any form of product or service or information of any means or form for which a representation has been made.

In some embodiments, the links or edges 104 of the citation graph 100 represent different forms of association between the subject nodes 102 and the object nodes 106, such as citations 104 of objects 106 by subjects 102. For non-limiting examples, citations 104 can be created by authors citing targets at some point of time and can be one of link, description, keyword or phrase by a source/subject 102 pointing to a target (subject 102 or object 106). Here, citations may include one or more of the expression of opinions on objects, expressions of authors in the form of Tweets, blog posts, reviews of objects on Internet web sites Wikipedia entries, postings to social media such as Twitter or Jaiku, postings to websites, postings in the form of reviews, recommendations, or any other form of citation made to mailing lists, newsgroups, discussion forums, comments to websites or any other form of Internet publication.

In some embodiments, citations 104 can be made by one subject 102 regarding an object 106, such as a recommendation of a website, or a restaurant review, and can be treated as representation an expression of opinion or description. In some embodiments, citations 104 can be made by one subject 102 regarding another subject 102, such as a recommendation of one author by another, and can be treated as representing an expression of trustworthiness. In some embodiments, citations 104 can be made by certain object 106 regarding other objects, wherein the object 106 is also a subject.

In some embodiments, citation 104 can be described in the format of (subject, citation description, object, timestamp, type). Citations 104 can be categorized into various types based on the characteristics of subjects/authors 102, objects/targets 106 and citations 104 themselves. Citations 104 can also reference other citations. The reference relationship among citations is one of the data sources for discovering influence network.

Figure 2:
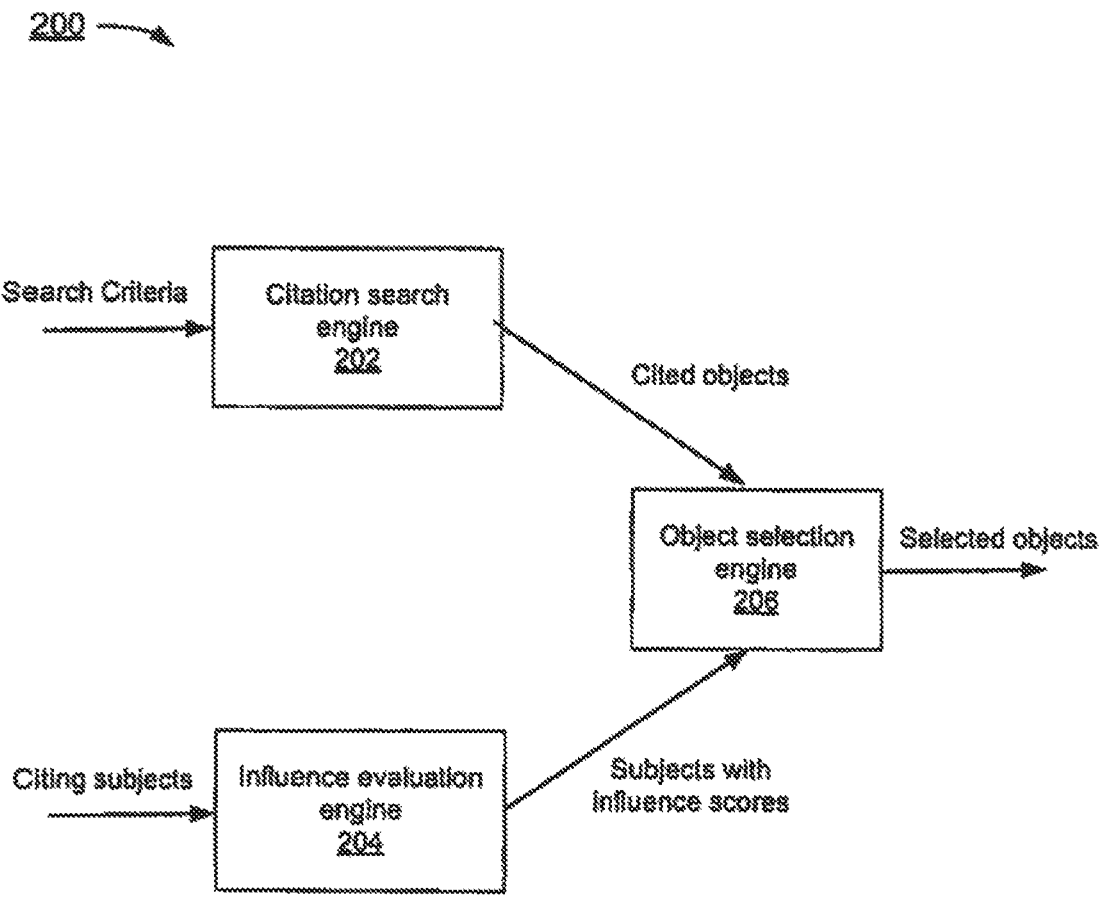
FIG. 2 depicts an example of a system diagram to support transfer of attributes among search entities.

FIG. 2 depicts an example of a system diagram to support determination of quality of cited objects in search results based on the influence of the citing subjects. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 2, the system 200 includes at least citation search engine 204, influence evaluation engine 204, and object selection engine 206. As used herein, the term engine refers to software, firmware, hardware, or other component that is used to effectuate a purpose. The engine will typically include software instructions that are stored in non-volatile memory (also referred to as secondary memory). When the software instructions are executed, at least a subset of the software instructions is loaded into memory (also referred to as primary memory) by a processor. The processor then executes the software instructions in memory. The processor may be a shared processor, a dedicated processor, or a combination of shared or dedicated processors. A typical program will include calls to hardware components (such as I/O devices), which typically requires the execution of drivers. The drivers may or may not be considered part of the engine, but the distinction is not critical.

In the example of FIG. 2, each of the engines can run on one or more hosting devices (hosts). Here, a host can be a computing device, a communication device, a storage device, or any electronic device capable of running a software component. For non-limiting examples, a computing device can be but is not limited to a laptop PC, a desktop PC, a tablet PC, an iPod, an iPhone, an iPad, Google's Android device, a PDA, or a server machine. A storage device can be but is not limited to a hard disk drive, a flash memory drive, or any portable storage device. A communication device can be but is not limited to a mobile phone.

In the example of FIG. 2, citation search engine 202, influence evaluation engine 204, and object selection engine 206 each has a communication interface (not shown), which is a software component that enables the engines to communicate with each other following certain communication protocols, such as TCP/IP protocol, over one or more communication networks (not shown). Here, the communication networks can be but are not limited to, internet, intranet, wide area network (WAN), local area network (LAN), wireless network, Bluetooth, WiFi, and mobile communication network. The physical connections of the network and the communication protocols are well known to those of skill in the art.

Citation Search

In the example of FIG. 2, citation search engine 202 enables a citation search process, which unlike the "classical web search" approaches that is object/target-centric and focuses only on the relevance of the objects 106 to the searching criteria, the search process adopted by citation search engine 202 is "citation" centric, focusing on influence of the citing subjects 102 that cite the objects. In addition, the classical web search retrieves and ranks objects 106 based on attributes of the objects, while the proposed search approach adds citation 104 and subject/author 102 dimensions. The extra metadata associated with subjects 102, citations 104, and objects 106 provide better ranking capability, richer functionality and higher efficiency for the searches.

In some embodiments, the citation search/query request processed by citation search engine 202 may accept and enforce various criteria/terms on citation searching, retrieving and ranking, each of which can either be explicitly described by a user or best guessed by the system based on internal statistical data. Such criteria include but are not limited to, a) Constraints for the citations, including but are not limited to, Description: usually the text search query;

Time range of the citations;

Author: such as from particular author or sub set of authors;

Type: types of citations;

b) Types of the cited objects: the output can be objects, authors or citations of the types including but are not limited to, Target types: such as web pages, images, videso, people Author types: such as expert for certain topic Citation types: such as tweets, comments, blog entries c) Ranking bias of the cited objects: which can be smartly guessed by the system or specified by user including but are not limited to, Time bias: recent; point of time; event; general knowledge; auto View point bias: such as general view or perspective of certain people.

Type bias: topic type, target type.

Influence Evaluation

In the example of FIG. 2, influence evaluation engine 204 calculates influence scores of entities (subjects 102 and/or objects 106), wherein such influence scores can be used to determine at least in part, in combination with other methods and systems, the ranking of any subset of objects 106 obtained from a plurality of citations 104 from citation search results.

In some embodiments, influence evaluation engine 204 measures influence and reputation of subjects 102 that compose the plurality of citations 104 citing the plurality of objects 106 on dimensions that are related to, for non-limiting examples, one or more of the specific topic or objects (e.g., automobiles or restaurants) cited by the subjects, or form of citations (e.g., a weblog or Wikipedia entry or news article or Twitter feed), or search terms (e.g., key words or phrases specified in order to define a subset of all entities that match the search term(s)), in which a subset of the ranked entities are made available based on selection criteria, such as the rank, date or time, or geography/location associated with the entity, and/or any other selection criteria.

In some embodiments, influence evaluation engine 204 determines an influence score for a first subject or source at least partly based on how often a first subject is cited or referenced by a (another) second subject(s). Here, each of the first or the second subject can be but is not limited to an internet author or user of social media services, while each citation describes reference by the second subject to a citation of an object by the first subject. The number of the citations or the citation score of the first subject by the second subjects is computed and the influence of the second subjects citing the first subject can also be optionally taken into account in the citation score. For a non-limiting example, the influence score of the first subject is computed as a function of some or all of: the number of citations of the first subject by second subjects, a score for each such citation, and the influence score of the second subjects. Once computed, the influence of the first subject as reflected by the count of citations or citation score of the first subject or subject can be displayed to the user at a location associated with the first subject, such as the "profile page" of the first subject, together with a list of the second subjects citing the first subjects, which can be optionally ranked by the influences of the second subject.

In some embodiments, influence evaluation engine 204 allows for the attribution of influence on subjects 102 to data sources (e.g., sources of opinions, data, or referrals) to be estimated and distributed/propagated based on the citation graph 100. More specifically, an entity can be directly linked to any number of other entities on any number of dimensions in the citation graph 100, with each link possibly having an associated score. For a non-limiting example, a path on a given dimension between two entities, such as a subject 102 and an object 106, includes a directed or an undirected link from the source to an intermediate entity, prefixed to a directed or undirected path from the intermediate entity to the object 106 in the same or possibly a different dimension.

In some embodiments, influence evaluation engine 204 estimates the influence of each entity as the count of actual requests for data, opinion, or searches relating to or originating from other entities, entities with direct links to the entity or with a path in the citation graph, possibly with a predefined maximum length, to the entity; such actual requests being counted if they occur within a predefined period of time and result in the use of the paths originating from the entity (e.g., representing opinions, reviews, citations or other forms of expression) with or without the count being adjusted by the possible weights on each link, the length of each path, and the level of each entity on each path.

In some embodiments, influence evaluation engine 204 adjusts the influence of each entity by metrics relating to the citation graph comprising all entities or a subset of all linked entities. For a non-limiting example, such metrics can include the density of the graph, defined as the ratio of the number of links to the number of linked entities in the graph; such metrics are transformed by mathematical functions optimal to the topology of the graph, such as where it is known that the distribution of links among entities in a given graph may be non-linear. An example of such an adjustment would be the operation of estimating the influence of an entity as the number of directed links connecting to the entity, divided by the logarithm of the density of the citation graph comprising all linked entities. For example, such an operation can provide an optimal method of estimating influence rapidly with a limited degree of computational complexity.

In some embodiments, influence evaluation engine 204 optimizes the estimation of influence for different contexts and requirements of performance, memory, graph topology, number of entities, and/or any other context and/or requirement, by any combination of the operations described above in paragraphs above, and any similar operations involving metrics including but not limited to values comprising: the number of potential source entities to the entity for which influence is to be estimated, the number of potential target entities, the number of potential directed paths between any one entity and any other entity on any or all given dimensions, the number of potential directed paths that include the entity, the number of times within a defined period that a directed link from the entity is used for a scoring, search or other operation(s).

Metadata Transfer

Figure 3:
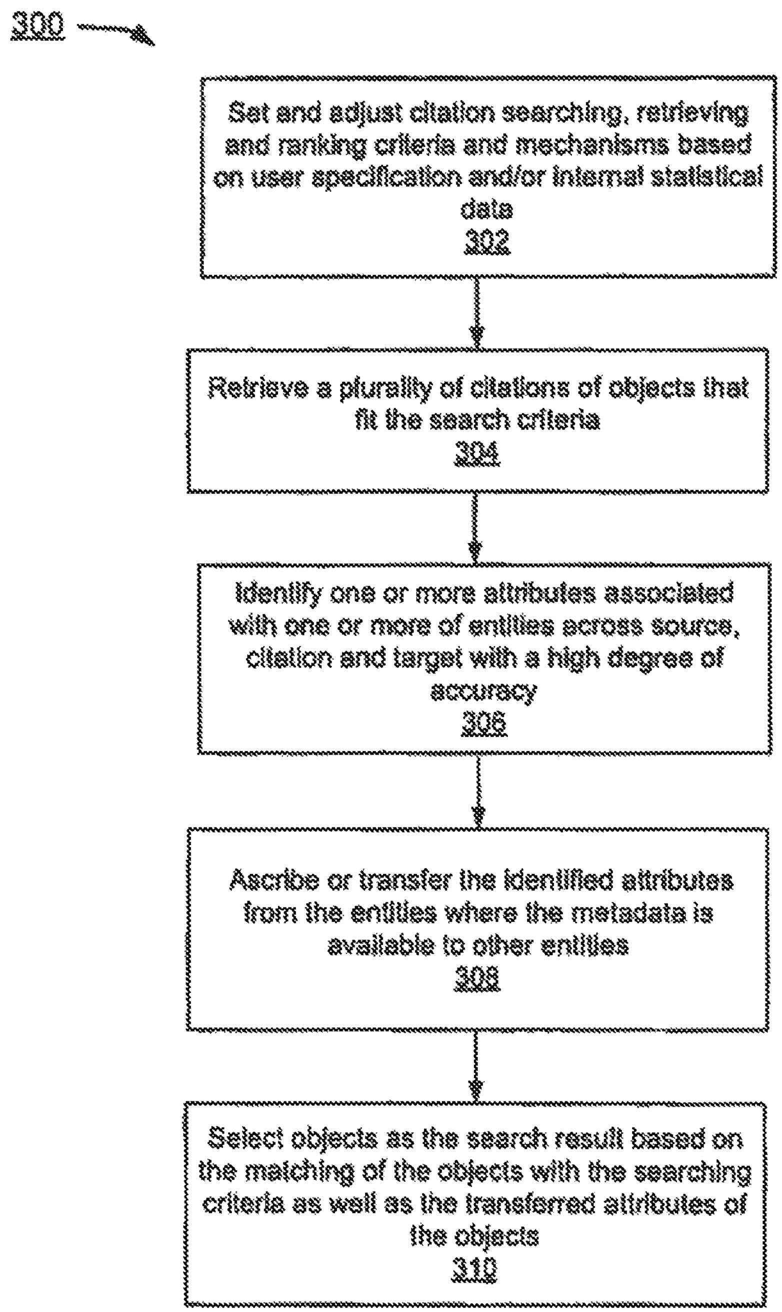
FIG. 3 depicts an example of a flowchart of a process to support transfer of attributes among search entities.

In the example of FIG. 2, object selection engine 206 ascribes or transfers metadata or attributes from one search-related entity to another, where each entity can be one of subject, citation, and object as depicted by an example of a process in FIG. 3. Although this figure depicts functional steps in a particular order for purposes of illustration, the process is not limited to any particular order or arrangement of steps. One skilled in the relevant art will appreciate that the various steps portrayed in this figure could be omitted, rearranged, combined and/or adapted in various ways.

In the example of FIG. 3, the flowchart 300 starts at block 302 where citation searching, retrieving and ranking criteria and mechanisms are set and adjusted based on user specification and/or internal statistical data. The flowchart 300 continues to block 304 where a plurality of citations of objects that fit the search criteria, such as text match, time filter, author filter, type filter, are retrieved. The flowchart 300 continues to block 306 where one or more attributes associated with one or more of entities across source, citation and target are identified with a high degree of probable accuracy. The flowchart 300 continues to block 308 where the identified attributes are ascribed or transferred from the entities where the attributes are available to other entities. The flowchart 300 ends at block 310 where objects are selected as the search result based on the matching of the objects with the searching criteria as well as the transferred attributes of the objects.

In some embodiments, the metadata or attributes of the entities identified and ascribed by the object selection engine 206 can be semantic or descriptive data regarding the entities, including but are not limited to, timestamp, language, and location of the entities, which can be utilized for the selection of the objects.

In the example of FIG. 2, object selection engine 206 utilizes the identified and ascribed attributes to determine the selection and ranking of objects 106 cited by the citations, wherein the objects include but are not limited to documents on the Internet, products, services, data files, legal or natural persons, or any entities in any form or means that can be searched or cited over a network. For a non-limiting example, the object selection engine 206 may sort the timestamps of citations of an object and ascribe the earliest timestamp to the object as the object's "birth" timestamp, i.e., providing a probably accurate estimate of when the object was created. For another non-limiting example, the object selection engine 206 may utilize the language or location of the subject, if known, to determine the language of the citation or the location of the object.

In some embodiments, the object selection engine 206 utilizes one of the attributes ascribed among the subjects, citations, and objects as various types of content filters to select the objects for the search result, wherein such attribute can be one of the properties of the objects or the citations. For a non-limiting example, if the citation includes obscene words, the object selection engine 206 may tag the objects as possibly obscene and the subjects as a source of obscene content. Similarly, if an object is flagged by users as obscene, the object selection engine 206 may also tag the subjects that cited that object as sources which cite obscene content.

In some embodiments, in combination with the ascribed attributes of objects described above, the object selection engine 206 may also calculate and rank the influence scores of the cited objects based on one or more of the following scoring components:

- Subjects of the citations: such as influence scores of the subjects/authors, expertise of the subjects on the give topic, perspective bias on the subjects of the citations.
- Citations: such as text match quality (e.g., content of citations matching search terms), number of citations, date of the citations, and other citations related to the same cited object, time bias, type bias etc.

For a non-limiting example, in the example depicted in FIG. 1, citing subject Author One has an influence score of 10, which composes Citation 1.1 and Citation 1.2, wherein Citation 1.1 cites Target One once while Citation 1.2 cites Target Two twice; citing subject Author Two has an influence score of 5, which composes Citation 2.1, which cites Target One three times; citing subject Author Three has an influence score of 4, which composes Citation 3.2, which cites Target Two four times. Based on the influence scores of the authors alone, object selection engine 206 calculates the influence score of Target One as $10*1+3*5=25$, while the influence score of Target Two is calculated as $10*2+4*4=36$. Since Target Two has a higher influence score than Target One, it should be ranked higher than Target One in the final search result.

In some embodiments, object selection engine 206 determines the qualities of the cited objects by examining the distribution of influence scores of subjects citing the objects in the search results. For a non-limiting example, one measure of the influence distribution is the ratio of the number of citations from the "influential" and the "non-influential" subjects, where "influential" subjects may, for a non-limiting example, have an influence score higher than a threshold determined by the percentile distribution of all influence scores. Object selection engine 206 accepts only those objects that show up in the citation search results if their citation ratios from "influential" and "non-influential" subjects are above a certain threshold while others can be marked as spam if the ratio of their citation ratios from "influential" and "non-influential" subjects fall below the certain threshold, indicating that they are most likely cited from spam subjects.

In some embodiments, object selection engine 206 calculates and ranks cited objects by treating citations of the objects as connections having positive or negative weights in a weighted citation graph. A citation with implicit positive weight can include, for a non-limiting example, a retweet or a link between individual blog posts or web cites, while a citation with negative weight can include, for a non-limiting example, a statement by one subject 102 that another source is a spammer.

In some embodiments, object selection engine 206 uses citations with negative weights in a citation graph-based rank/influence calculation approach to propagate negative citation scores through the citation graph. Assigning and propagating citations of negative weights makes it possible to identify clusters of spammers in the citation graph without having each spammer individually identified. Furthermore, identifying subjects/sources 102 with high influence and propagating a few negative citations from such subjects is enough to mark an entire cluster of spammers negatively, thus reducing their influence on the search result.

In some embodiments, object selection engine 206 presents the generated search results of cited objects to a user who issues the search request or provides the generated search results to a third party for further processing. In some embodiments, object selection engine 206 presents to the user a score computed from a function combining the count of citations and the influence of the subjects of the citations along with the search result of the objects. In some embodiments, object selection engine 206 displays multiple scores computed from functions combining the counts of subsets of citations and the influence of the source of each citation along with the search result, where each subset may be determined by criteria such as the influence of the subjects, or attributes of the subjects or the citations. For non limiting-examples, the following may be displayed to the user—"5 citations from Twitter; 7 citations from people in Japan; and 8 citations in English from influential users." The subsets above may be selected and/or filtered either by the object selection engine 206 or by users.

In some embodiments, object selection engine 206 selects for display of every object in the search result, one or more citations and the subjects of the citations on the basis of criteria such as the recency or the influence of their citing subjects relative to the other citations in the search result. Object selection engine 206 then displays the selected citations and/or subjects in such a way that the relationship between the search result, the citations and the subjects of the citations are made transparent to a user.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

One embodiment includes a computer program product which is a machine readable medium (media) having instructions stored thereon/in which can be used to program one or more hosts to perform any of the features presented herein. The machine readable medium can include, but is not limited to, one or more types of disks including floppy disks, optical discs, DVD, CD-ROMs, micro drive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data. Stored on any one of the computer readable medium (media), the present invention includes software for controlling both the hardware of the general purpose/specialized computer or microprocessor, and for enabling the computer or microprocessor to interact with a human viewer or other mechanism utilizing the results of the present invention. Such software may include, but is not limited to, device drivers, operating systems, execution environments/containers, and applications.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Particularly, while the concept "interface" is used in the embodiments of the systems and methods described above, it will be evident that such concept can be interchangeably used with equivalent software concepts such as, class, method, type, module, component, bean, module, object model, process, thread, and other suitable concepts. While the concept "component" is used in the embodiments of the systems and methods described above, it will be evident that such concept can be interchangeably used with equivalent concepts such as, class, method, type, interface, module, object model, and other suitable concepts. Embodiments were chosen and described in order to best describe the principles of the invention and its practical application, thereby enabling others skilled in the relevant art to understand the claimed subject matter, the various embodiments and with various modifications that are suited to the particular use contemplated.

What is claimed is:

1. A non-transitory machine readable medium containing executable program instructions which when executed by a data processing device cause the device to perform a method comprising:

selecting a plurality of objects by retrieving a plurality of citations that are composed by the plurality of subjects citing one or more of a plurality of objects that fit searching criteria;

identifying at least one incomplete attribute from the one or more of the plurality of objects and at least one identified attribute from the plurality of the citations corresponding to the at least one incomplete attribute from the one or more of the plurality of objects;

transferring the at least one identified attribute from the plurality of the citations to the one or more of the plurality of objects that is having the at least one incomplete attribute, wherein the attributes are applicable to the one of the plurality of objects;

ranking the plurality of objects cited by the plurality of citations using one or more attributes, wherein the one or more attributes include the at least one identified attribute transferred from the plurality of citations;

displaying at least some of the plurality of objects.

2. The machine readable medium of claim 1, wherein:

each of the plurality of subjects is one of: representation of a person, web log, and entities representing Internet authors or users of social media services, user of microblogging services, users of social networks, reviewer who provides expressions of opinion, reviews, or other information useful for the estimation of influence.

3. The machine readable medium of claim 1, wherein:

each of the plurality of objects is one of: Internet web sites, blogs, videos, books, films, music, image, video, documents, data files, objects for sale, objects that are reviewed or recommended or cited, subjects/authors, natural or legal persons, citations, or any entities that are associated with a Uniform Resource Identifier (URI).

4. The machine readable medium of claim 1, wherein:

each of the plurality of citations includes one or more of: expression of opinions on the objects, expressions of authors in the form of Tweets, blog posts, reviews of objects on Internet web sites Wikipedia entries, postings to social media, postings to websites, postings in the form of reviews, recommendations, or any other form of citation made to mailing lists, newsgroups, discussion forums, comments to websites or any other form of Internet publication.

5. The machine readable medium of claim 1, further comprising:

accepting and enforcing a plurality of criteria on citation searching, retrieving and ranking, each of which is either be explicitly described by a user or best guessed by a system based on internal statistical data.

6. The machine readable medium of claim 1, further comprising:

sorting timestamps of the citations of an object and ascribing an earliest timestamp to the object as the object's birth timestamp, which provides an accurate estimate of when the object was created.

7. The machine readable medium of claim 1, further comprising:

utilizing known language or location of the subjects to determine the language of the citations or the location of the objects.

8. The machine readable medium of claim 1, further comprising:

utilizing one of the attributes as a content filter to select the objects for the search result, wherein such attribute is one of properties of the objects or the citations.

9. The machine readable medium of claim 1, further comprising:

calculating influence scores of the plurality of subjects that compose the plurality of citations citing the plurality of objects.

10. The machine readable medium of claim 1, wherein identified attribute is selected from the group consisting of time, location, and language of at least one of the plurality of citations.

11. The machine readable medium of claim 1, wherein the at least one incomplete attribute is selected from the group consisting of a timestamp, language identifier, and location identifier.

12. A method comprising:

retrieving a plurality of citations that are composed by a plurality of subjects citing one or more of a plurality of objects that fit searching criteria;

identifying at least one incomplete attribute from the one or more of the plurality of objects and at least one identified attribute from the plurality of the citations corresponding to the at least one incomplete attribute from the one or more of the plurality of objects;

transferring at least one identified attribute from the plurality of the citations to the one or more of the plurality of objects that is having the at least one incomplete attribute, wherein the attributes are applicable to the one of the plurality of objects;

selecting a subset of objects from the plurality of objects as a search result based on a matching of the searching criteria with the at least one identified attributes transferred to at least one of the plurality of objects from the citations; and ranking the subset of objects cited by the plurality of citations using a ranking searching criteria;

displaying at least some of the subset of objects.

13. The method of claim 12, wherein:

each of the plurality of subjects is one of: representation of a person, web log, and entities representing Internet authors or users of social media services, user of microblogging services, users of social networks, reviewer who provides expressions of opinion, reviews, or other information useful for the estimation of influence.

14. The method of claim 12, wherein:

each of the plurality of objects is one of: Internet web sites, blogs, videos, books, films, music, image, video, documents, data files, objects for sale, objects that are reviewed or recommended or cited, subjects/authors, natural or legal persons, citations, or any entities that are associated with a Uniform Resource Identifier (URI).

15. The method of claim 12, wherein:

each of the plurality of citations includes one or more of: expression of opinions on the objects, expressions of authors in the form of Tweets, blog posts, reviews of objects on Internet web sites Wikipedia entries, postings to social media, postings to websites, postings in the form of reviews, recommendations, or any other form of citation made to mailing lists, newsgroups, discussion forums, comments to websites or any other form of Internet publication.

16. The method of claim 12, further comprising:

accepting and enforcing a plurality of criteria on citation searching, retrieving and ranking, each of which is either be explicitly described by a user or best guessed by a system based on internal statistical data.

17. The method of claim 12, further comprising:

sorting timestamps of the citations of an object and ascribing an earliest timestamp to the object as the object's birth timestamp, which provides an accurate estimate of when the object was created.

18. The method of claim 12, further comprising:

utilizing known language or location of the subjects to determine the language of the citations or the location of the objects.

19. The method of claim 12, further comprising:

utilizing one of the attributes as a content filter to select the objects for the search result, wherein such attribute is one of properties of the objects or the citations.

20. The method of claim 12, further comprising:

calculating influence scores of the plurality of subjects that compose the plurality of citations citing the plurality of objects.

21. The method of claim 12, wherein the at least one incomplete attribute is selected from the group consisting of a timestamp, language identifier, and location identifier.

22. A method comprising:

selecting a plurality of objects by retrieving a plurality of citations that are composed by a plurality of subjects citing one or more of the plurality of objects that fit searching criteria;

identifying at least one incomplete attribute from the one or more of the plurality of objects and at least one identified attribute from the plurality of the citations corresponding to the at least one incomplete attribute from the one or more of the plurality of objects;

transferring the at least one identified attribute from the plurality of the citations to the one or more of the plurality of objects that is having the at least one incomplete attribute, wherein the attributes are applicable to the one of the plurality of objects; and ranking the plurality of objects cited by the plurality of citations using one or more attributes, wherein the one or more attributes include the at least one identified attribute transferred from the plurality of citations;

displaying at least some of the plurality of objects.

23. A non-transitory machine readable medium containing executable program instructions which when executed by a data processing device cause the device to perform a method comprising retrieving a plurality of citations that are composed by a plurality of subjects citing one or more of a plurality of objects that fit searching criteria;

identifying at least one incomplete attribute from the one or more of the plurality of objects and at least one identified attribute from the plurality of the citations corresponding to the at least one incomplete attribute from the one or more of the plurality of objects;

transferring at least one identified attribute from the plurality of the citations to the one or more of the plurality of objects that is having the at least one incomplete attribute, wherein the attributes are applicable to the one of the plurality of objects;

selecting a subset of objects from the plurality of objects as a search result based on a matching of the searching criteria with the at least one identified attributes transferred to at least one of the plurality of objects from the citations; and ranking the subset of objects cited by the plurality of citations using a the searching criteria;

displaying at least some of the subset of objects.

* * * * *